UNITED STATES PATENT OFFICE.

KASPAR WINKLER, OF ALTSTETTEN, NEAR ZURICH, SWITZERLAND.

PROCESS FOR TREATING MORTAR, CEMENT, CONCRETE, AND THE LIKE.

No Drawing.　　　Application filed June 16, 1921.　Serial No. 478,200.

*To all whom it may concern:*

Be it known that I, KASPAR WINKLER, a citizen of Switzerland, residing at Gehrenweg 9, Altstetten, near Zurich, in the canton of Zurich and Republic of Switzerland, have invented certain new and useful Improvements in a Process for Treating Mortar, Cement, Concrete, and the like, of which the following is a specification.

For carrying out difficult work which calls for completely waterproof materials, the known means for making cement, mortar and concrete waterproof as well as the so-called waterproof cement obtainable on the market have proved, almost without exception, to be thoroughly inadequate. Two circumstances are to blame for this. In the first place the production of the imperviousness is almost always obtained at the expense of some of the original good qualities of the cement, in particular hardness and strength; and secondly, the said means and preparations only take account in exceptional cases and to an insufficient degree of the fact that mortar and cement, if they are to be suitable for use in carrying out difficult or unyielding work, must also possess, in addition to the property of being waterproof, some other special qualities, or their properties must be increased far above the usual maximum. The following are particularly indispensable, viz: a considerably shortened time for setting, extraordinarily rapid hardening and a considerably increased adhering power. If these qualities are missing, the mortar or cement can at the most be used in those cases when the work can be carried out confortably and without disturbance and with the exclusion of dampness and water. If an attempt is made to carry out difficult hydraulic work, such as stopping up incursions of water in tunnels or shafts, with such materials the want of the aforesaid special additional properties makes itself felt almost at once in that the mortar or cement which has been applied is immediately expelled by the flow of water. If, in an exceptional case, the material has been made to adhere successfully, then, after a short time, the water which is held back breaks through the coating which is insufficiently set. The quality of being waterproof is not, therefore, the quality which ranks first in such work. It can in any case only come into successful operation if the cement or mortar satisfies in the first place the aforesaid conditions respecting setting, hardening and adhering power.

It has now been found that all the aforesaid valuable properties, including that of being completely waterproof, can be imparted to mortar and cement if a potassium silicate solution is used for mixing. The strength and proportions of the potassium silicate solution should be such that for every 100 parts by weight of dry cement or of a dry mixture of cement and sand, lime and sand or the like to be used, there are added 4 to 20 parts by weight of $SiO_2$ in the form of potassium silicate. The proportion depends partly on the nature of the work to be executed and partly on the nature of the cement, mortar or the like which is to be employed.

If only a small pressure of water has to be resisted, satisfactory results are obtained when 4-10 parts by weight of $SiO_2$ in the form of potassium silicate are added for each 100 parts by weight of the dry material to be used. The same generally holds good in those cases in which the highest claims are not made on the waterproof material in every respect.

When the water pressure is great and there is a strong flow of water, as usual with difficult work, in which case it is a question of instantaneous setting, quick hardening, great strength, complete imperviousness and durability, the mortar or cement must be incorporated with at least one of the hereinbelow specified substances in addition to the potassium silicate solution:—calcium nitrate, strontium nitrate, barium nitrate, magnesium nitrate, antimony oxide, barium borate, potassium chromate, potassium bichromate, potassium ferro- or ferri-cyanide, manganese carbonate, alkali particularly potassium hydroxide, calcium carbonate, borax, bauxite, coke of tar, sugar.

Each of the substances enumerated above exerts a particular action which is generally apparent in manifold directions. Sometimes the actions of the different substances added partly screen one another or overlap. Some of them intensify to an approximately equal extent several qualities of the mortar or cement, while with others the effect on one particular quality, occasionally on several, is strongly preponderating. In such circumstances therefore an exact and detailed classification of the effects of the various additional substances is not possible, nevertheless the following remarks may be made on the subject.

Manganese carbonate generally reinforces the action of the potassium silicate. The nitrates are chiefly favourable to hardness. Calcium carbonate and especially coke of tar increase the imperviousness. Alkali hydroxides and sugar increase the adhering power.

It is thus possible, by choosing suitable substances and adding them in suitable proportions, to cause one or more of those qualities which are under consideration for the purpose on hand to predominate. The incorporation is suitably effected by dissolving the alkali hydroxide in the potassium silicate and mixing with the latter the insoluble substance or substances in the state of fine powder. In order to obtain a uniform distribution of the added insoluble substance or substances the potassium silicate solution must be thoroughly stirred immediately before use, when the insoluble substance or substances will form a suspension. Of the nitrates ¼ to 3 per cent by weight are needed with respect to the potassium silicate solution. The soluble chromium compounds and potassium ferro- or ferricyanide are added in the proportion of ¼ to 1½ per cent by weight in the form of 10-12% solutions. Most of the remaining additional substances are only employed in quite small proportions not exceeding ¼ per cent by weight. If these limits are exceeded undesirable secondary actions take place.

Those of the aforesaid substances which are not hygroscopic and undergo no change when in contact with dry lime or cement, can also be mixed with the dry lime-sand mixture, cement or concrete.

*Example I.*

|  | Parts by weight. |
|---|---|
| Potassium silicate solution of 27-33° Bé | 92 |
| Potassium chromate | ½ |
| Sugar | 1½ |
| Coke of tar | 4 |
| Calcium nitrate | 2 |
|  | 100 |

*Example II.*

|  | Parts by weight. |
|---|---|
| Potassium silicate solution of 27-33° Bé | 95 |
| Calcium nitrate solution (about 12% solution) | 3½ |
| Alkali hydroxide | 1½ |
|  | 100 |

*Example III.*

|  | Parts by weight. |
|---|---|
| Potassium silicate solution of 27-33° Bé | 99½ |
| Manganese carbonate | ½ |
|  | 100 |

In comparison with the cement or mortar which is made in the usual manner, that gauged in accordance with the present process, apart from being entirely waterproof, is distinguished above all for the rapidity with which it sets and hardens. If the finished preparation possesses a concentration of 27° Bé., the result is that it sets, as it were, instantaneously and the mortar or cement becomes stonehard, i. e., unscratchable after about 10 minutes. If 50% of water is added, setting occurs after about 3 minutes. After about one hour the hardness is about 40% of the normal hardness of a cement mixed with water.

The mortar and cement gauged in accordance with the present process are also distinguished by their complete durability in the presence of sea-water and water containing sulfate of lime.

What I claim is:—

1. A process of treating cementitious material, consisting in gauging said material with a liquid which comprises a solution of potassium silicate incorporated with an alkali hydroxide and manganese carbonate.

2. A process of treating cementitious material, consisting in gauging said material with a liquid which comprises a solution of potassium silicate incorporated with an alkali hydroxide, manganese carbonate and bauxite.

3. A process of treating cementitious material, consisting in gauging said material with a liquid which comprises a solution of potassium silicate incorporated with an alkali hydroxide, manganese carbonate, bauxite and antimony oxide.

In testimony whereof I have affixed my signature.

KASPAR WINKLER.